(12) United States Patent
Krulce et al.

(10) Patent No.: US 10,216,266 B2
(45) Date of Patent: Feb. 26, 2019

(54) SYSTEMS AND METHODS FOR DEVICE INTERACTION BASED ON A DETECTED GAZE

(71) Applicant: QUALCOMM Incorporated, San Diego, CA (US)

(72) Inventors: Darrell L. Krulce, Solana Beach, CA (US); Francis B. MacDougall, Toronto (CA); Shaun W. Van Dyken, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 199 days.

(21) Appl. No.: 13/831,197

(22) Filed: Mar. 14, 2013

(65) Prior Publication Data

US 2014/0267034 A1   Sep. 18, 2014

(51) Int. Cl.
 *G06F 3/01*  (2006.01)
 *G06F 1/3234* (2019.01)
 *G06F 21/32*  (2013.01)

(52) U.S. Cl.
 CPC ............ *G06F 3/013* (2013.01); *G06F 1/3265* (2013.01); *G06F 21/32* (2013.01); *Y02D 10/153* (2018.01); *Y02D 50/20* (2018.01)

(58) Field of Classification Search
 CPC ......... G09G 3/003; G06F 3/011; G06F 3/012; G06F 3/013
 See application file for complete search history.

(56) References Cited

U.S. PATENT DOCUMENTS

| 4,836,670 A | 6/1989 | Hutchinson |
| 7,986,816 B1 | 7/2011 | Hoanca et al. |
| 8,614,673 B2 | 12/2013 | Binder |
| 2005/0047629 A1 | 3/2005 | Farrell et al. |
| 2005/0199783 A1 | 9/2005 | Wenstrand et al. |

(Continued)

FOREIGN PATENT DOCUMENTS

| CN | 102662524 A | 9/2012 |
| EP | 0810512 A1 | 12/1997 |

(Continued)

OTHER PUBLICATIONS

International Search Report and Written Opinion—PCT/US2014/025346—ISA/EPO—dated Jun. 18, 2014.

(Continued)

*Primary Examiner* — William Boddie
*Assistant Examiner* — Jeffrey Parker
(74) *Attorney, Agent, or Firm* — Polsinelli/Qualcomm

(57) ABSTRACT

Systems and methods are provided that allow a user to interact with a device using gaze detection. In the provided systems and methods, the gaze detection is initiated by detecting a triggering event. Once gaze detection has been initiated, detecting a gaze of a user may allow the user to activate a display component of the device, pass a security challenge on the device, and view content and alerts on the device. The gaze detection may continue looking for the user's gaze and keep the display component of the device activated as long as a gaze is detected, but may deactivate the display component of the device once a gaze is no longer detected. To conserve power the gaze detection may also be deactivated until another triggering event is detected.

31 Claims, 4 Drawing Sheets

(56) References Cited

U.S. PATENT DOCUMENTS

| | | | |
|---|---|---|---|
| 2006/0192775 | A1 | 8/2006 | Nicholson et al. |
| 2007/0078552 | A1* | 4/2007 | Rosenberg ............... 700/94 |
| 2010/0153764 | A1 | 6/2010 | Pratt et al. |
| 2011/0157354 | A1* | 6/2011 | Kawahito ............ G01S 7/4863 348/140 |
| 2012/0071149 | A1* | 3/2012 | Bandyopadhyay ... G06F 1/1643 455/418 |
| 2012/0172085 | A1 | 7/2012 | Vuppu et al. |
| 2012/0243729 | A1* | 9/2012 | Pasquero ............... 382/103 |
| 2013/0063349 | A1* | 3/2013 | Rankin ............... G06F 1/3262 345/158 |
| 2013/0163706 | A1* | 6/2013 | Tai ..................... H04L 7/0012 375/354 |
| 2013/0176208 | A1 | 7/2013 | Tanaka et al. |
| 2013/0278547 | A1* | 10/2013 | Wu et al. ............... 345/174 |
| 2014/0063055 | A1* | 3/2014 | Osterhout et al. ......... 345/633 |
| 2014/0250395 | A1* | 9/2014 | Tanaka ................ G06F 3/013 715/765 |
| 2017/0187237 | A1* | 6/2017 | Message Thebaudeau .............. H02J 13/0017 |

FOREIGN PATENT DOCUMENTS

| | | |
|---|---|---|
| EP | 2450872 A1 | 5/2012 |
| EP | 2503479 A1 | 9/2012 |
| JP | H09120323 A | 5/1997 |
| JP | H10240389 A | 9/1998 |
| JP | H11288259 A | 10/1999 |
| JP | 2005269891 A | 9/2005 |
| JP | 2006217487 A | 8/2006 |
| JP | 2008015800 A | 1/2008 |
| JP | 2012065107 A | 3/2012 |
| WO | WO-2012154456 A1 | 11/2012 |
| WO | 2012170803 A1 | 12/2012 |

OTHER PUBLICATIONS

Pino C., et al., "Improving Mobile Device Interaction by Eye Tracking Analysis," Proceedings of the Federated Conference on Computer Science and Information Systems, IEEE, 2012, pp. 1199-1202.
Bowman, Z, "Hand gesture controls coming to a car near you?" Autoblog, http://www.autoblog.com/2012/07/29/hand-gesture-controls-coming-to-a-car-near-you/, Jul. 29, 2012, 2 pages.
De Silva, G. C., et al., "Human Factors Evaluation of a Vision-Based Facial Gesture Interface", 2012 IEEE Symposium on 3D User Interface (3DUI), Mar. 4-5, 2012, 8 pages.
Extreme Reality, "XTR3D/We enable 3D motion controlled games (X, Y and Z coordinates) . . . ", http://www.xtr3d.com/ Sep. 4, 2013, 1 page.
EyeSight's Gesture Recognition Technology—Machine Vision Software, www.eyesight-tech.com/technology, Jul. 11, 2013, 2 pages.
Flutter, "Flutter Control Music & Movies with Gestures", https://flutterapp.com/, Aug. 20, 2013, 2 pages.
Hopmann M., et al.,, et al., "Natural Activation for Gesture Recognition Systems", CHI 2011 Session: Gestures, May 7-12, 2011, 11 pages.
Hu, M., et al., "Visual Pattern Recognition by Moment Invariants", IRE Transaction on Information Theory, Feb. 1962, pp. 179-187.
Hurst, W., et al., "Gesture-Based Interaction via Finger Tracking for Mobile Augmented Reality", Multimedia Tools and Applications, 2012, 26 pages.
Lai, H, "Using Commodity Visual Gesture Recognition Technology to Replace or to Augment Touch Interfaces", 15th Twente Student Conference on IT, Jun. 20, 2011, 7 pages.
Letessier, J., et al., "Visual Tracking of Bare Fingers for Interactive Surfaces", 17th Annual ACM Symposium on User Interface Software and Technology, 2004, vol. 6, Issue 2, pp. 119-122.
Logitech, "HD Pro Webcam C910", http://www.logitech.com/en-us/support/hd-pro-webcam-c910?osid=14&bit, Aug. 20, 2013, 1 page.
Malik, S., et al., "Visual Touchpad: A Two-handed Gestural Input Device", 6th International Conference on Mutilmodal Interfaces, 2004, pp. 289-296.
Mark's Think Tank, "Wave Control Touchless Media Control", http://marksthinktank.com/wavecontrol, Sep. 4, 2013, 2 pages.
Microsoft, "Kinect-Xbox.com", http://www.xbox.com/en-US/kinect, Aug. 20, 2013, 3 pages.
Mistry, P., et al., "WUW—Wear UR World—A Wearable Gestural Interface", CHI 2009 Spotlight on Works in Progress Session 1, Apr. 4-9, 2009, pp. 4111-4116.
Mo, Z., et al., "Lexical Gesture Interface", CGIT Lab, University of Southern California, $4^{th}$ IEEE International Conference on Computer Vision Systems (ICVS 2006), Jan. 2006, 8 pages.
mobilewitch.com, "Pantech releases Vega S5", http://www.mobilewitch.com/Pantech-releases-Vega-S5_new_details_1268.htm, Aug. 20, 2013, 2 pages.
Mustafa, A., et al., "Background Reflectance Modeling for Robust Finger Gesture Detection in Highly Dynamic Illumination", Convergence and Hybrid Information Technology, 2011, pp. 748-761.
Newcomb, D., "Harmon Unveils Kinect-Style Gesture-Recognition Concept for Cars", Wired, http://www.wired.com/autopia/2012/07/harmon-gestures, Jul. 26, 2012, 2 pages.
O'Hagan, R.G., et al., "Visual gesture interfaces for virtual environments", Interacting with Computers 14, 2002, pp. 231-250.
Oka, K., et al., "Real-Time Fingertip Tracking and Gesture Recognition", Computer Graphics and Applications IEEE, 2002, pp. 64-71.
Pantech USA, "A New Way to Stay Connected", http://www.pantechusa.com, Aug. 21, 2013, 2 pages.
Parjares, M., et al., "Usability analysis of a pointing gesture interface", 2004 IEEE International Conference on Systems, Man and Cybermetics, pp. 2652-2657.
Pavlovic, Vladimir I., et al., "Visual Interpretation of Hand Gestures for Human-Computer Interaction: A Review", IEEE Transactions on Pattern Analysis and Machine Intelligence, vol. 19, No. 7, Jul. 1997, pp. 677-695.
PC Advisor, "Sony Experia sola review", http://www.pcadvisor.co.uk/reviews/mobile-phone/3357406/sony-xperia-sola-preview/, Aug. 20, 2013, 7 pages.
Pointgrab, "Natural User Interface Pointgrab hand gesture recognition", Aug. 20, 2013, 1 page.
Primesense, "3D Sensors and Natural Interaction solutions—PrimeSense#5", http://www.primesense.com, Sep. 4, 2013, 8 pages.
Ravikiran, J., et al., "Finger Detection for Sign Language Recognition", Proceedings of the International MultiConference of Engineers and Computer Scientists 2009 vol. 1, IMECS 2009, Mar. 18-20, 2009, 5 pages.
Ren, G., et al., "3D Marking Menu Selection with Freehand Gestures", IEEE Symposium on 3D User Interfaces Mar. 4-5, 2012, pp. 61-68.
Rico, J., et al., "Usable Gestures for Mobile Interfaces: Evaluating Social Acceptability", CHI 2010: Gesturing and Drawing, Apr. 10-15, 2010, pp. 887-896.
Samsung, "Experience the Future of Smart TV Now", www.samsung.com/us/video/tvs/UN55ES8000FXZA-features, Aug. 21, 2013, 7 pages.
Samsung, "Interactive Smart TV with Face Recognition", https://www.samsung.com/us/2012-smart-tv/index.html, Aug. 20, 2013, 5 pages.
Samsung, "Specifications Samsung GalaxyS3", http://www.samsung.com/global/galaxy3/specifications.html, Aug. 20, 2013, 2 pages.
Softkinetic, "SoftKinetic the Interface is You", http://www.softkinetic.com, Aug. 21, 2013, 1 page.
Song, P., et al., "Vision-based 3D Finger Interactions for Mixed Reality Games with Physics Simulation", 7th ACM SIGGRAOH International Conference on Virtual Reality Continuum and Its Applications in Industry, 2008, 6 pages.
Toshiba, "Toshiba Qosmio Laptop Computers", http://us.toshiba.com/computers/laptops/qosmio, Aug. 20, 2013, 2 pages.
Reissner, Uli, "Gestures and Speech in Cars", http://www.14.informatik.tumuenchen.de/konferenzen/Jass07/courses/3/3_Gestures-and-Speech-in-Cars_Report.pdf, Aug. 20, 2013, 12 pages.

(56) References Cited

OTHER PUBLICATIONS

Waze, "Waze Outsmarting Traffic, Together", http://www.waze.com/wiki/, Sep. 4, 2013, 5 pages.
You Tube, "Sky Vega LTE Phone review part 2 (English)", http://www.youtube.com/watch?v=y1RcVZp9ZWU, Uploaded on Nov. 13, 2011, 3 pages.
Mo, Z., et al., "A Framework for Gesture Interface Design", University of Southern California, Journal of Multimedia, vol. 2, No. 1, Feb. 2007, 9 pages.

* cited by examiner

SYSTEMS AND METHODS FOR DEVICE INTERACTION BASED ON A DETECTED GAZE

TECHNICAL FIELD

Embodiments disclosed herein are generally directed to systems and methods for interacting with devices based on a detected gaze

BACKGROUND

As electronic devices become faster and have larger displays with increased resolution, the power needed to operate these electronic devices also increases. In order to conserve power, many devices include settings that will turn the displays off when not in use.

However, when a user wants to interact with the device, the user often first needs to press a button, or otherwise manually interact with the device to activate the display. For example, a desktop computer often requires the user to press one or more buttons, or manipulate an interaction device such as a mouse to activate the display. On mobile devices, the user may have to press a button or tap the display. Further, on devices that include security challenges, such as lockscreens, the user often also has to perform an unlock function, whether it is a simple swipe on a mobile device, or entering a complex password.

Accordingly, what is needed is a method for interacting with a device that provides an improved and smoother interaction experience, and makes it easier for a user to interact with the device.

SUMMARY

Consistent with some embodiments, there is provided a system for interacting with a device based on a detected gaze. The system includes one or more sensors configured to detect a triggering event, and an optical detection sensor module configured to detect a gaze of a user, the optical detection sensor module being activated when the one or more sensors detect a triggering event. The system also includes a display component, the display component being activated when the optical detection sensor detects a gaze of the user, wherein the display component is deactivated after a predetermined amount of time when the optical detection sensor no longer detects a gaze.

Consistent with some embodiments, there is further provided a method for device interaction. The method includes steps of detecting a triggering event, activating gaze detection when a triggering event is detected, determining, based on information from an optical detection sensor, whether a gaze is detected based on the activated gaze detection, activating a display of the device when a gaze is detected, and deactivating the gaze detection after a predetermined amount of time when a gaze is not detected. The method may also be embodied in a computer-readable medium.

Consistent with some embodiments, there is further provided a method for displaying content on a device. The method includes steps of determining that the content is available for display by the device, activating a display component of the device and an optical detection sensor of the device when content is determined to be available for display, determining, by one or more processors of the device in communication with the optical detection sensor, whether a gaze is detected, displaying the content when a gaze is detected and keeping the display component active as long as the gaze is detected, and deactivating the optical detection sensor and the display component when a gaze is not detected.

Consistent with some embodiments, there is further provided a system for device interaction. The system includes means for detecting a triggering event and means for detecting a gaze, the means for detecting a gaze being activated when a trigger event is detected. The system also includes means for determining whether a gaze is detected, means for activating a display of the device when a gaze is detected, and means for deactivating the gaze detection after a predetermined amount of time if a gaze is not detected.

Figure 1:
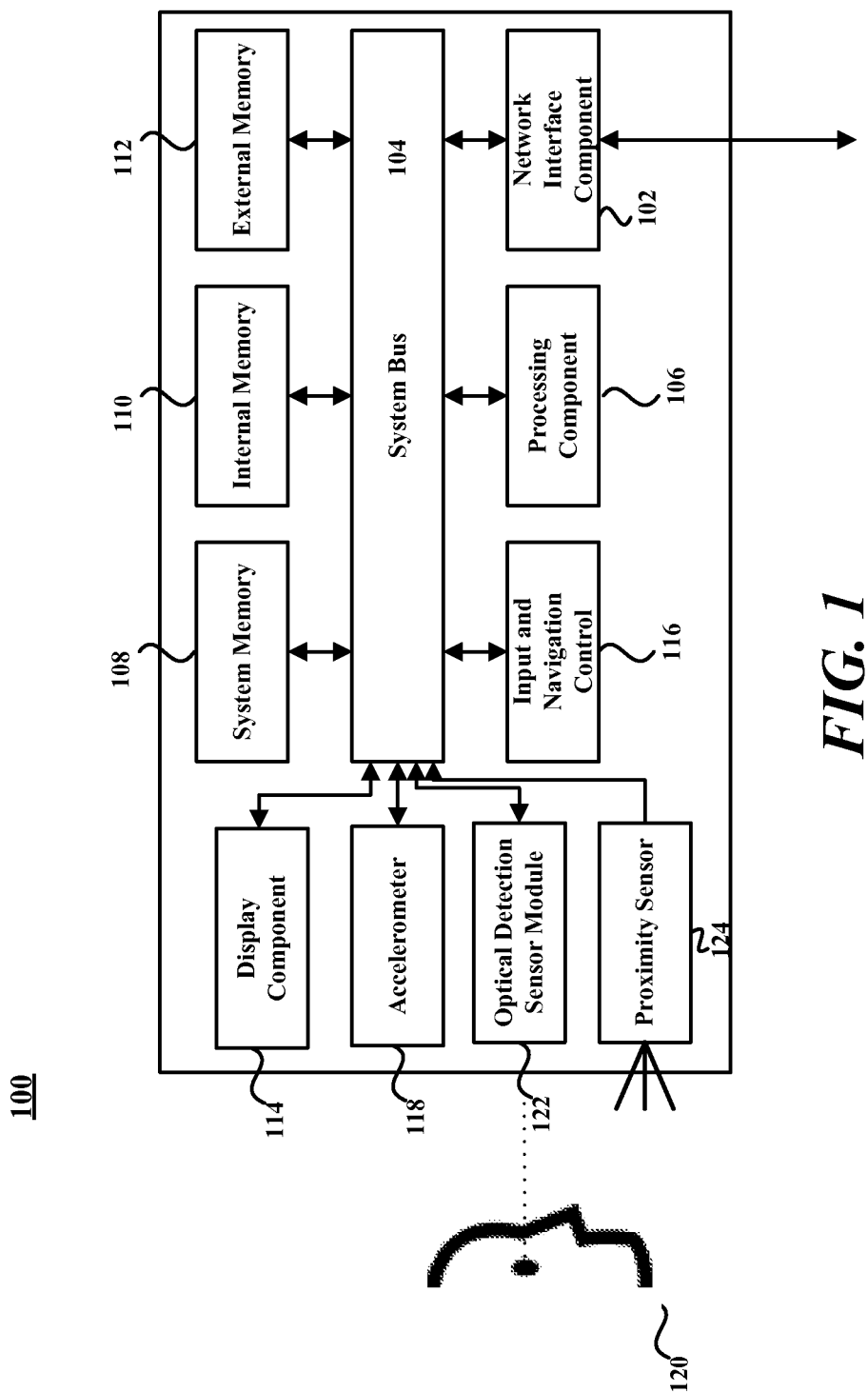
FIG. 1 is a diagram illustrating a processing device, consistent with some embodiments.

In the drawings, elements having the same designation have the same or similar functions.

DETAILED DESCRIPTION

In the following description specific details are set forth describing certain embodiments. It will be apparent, however, to one skilled in the art that the disclosed embodiments may be practiced without some or all of these specific details. The specific embodiments presented are meant to be illustrative, but not limiting. One skilled in the art may realize other material that, although not specifically described herein, is within the scope and spirit of this disclosure.

FIG. 1 is a diagram illustrating a processing device 100, consistent with some embodiments. Processing device 100 may be a mobile device such as a smartphone such as an iPhone™ or other mobile device running the iOS™ operating system, the Android™ operating system, a BlackBerry™ operating system, the Microsoft® Windows® Phone operating system, Symbian™ OS, or webOS™. Processing device 100 may also be a tablet computer, such as an iPad™ or other tablet computer running one of the aforementioned operating systems. Processing device 100 may also be PCs or laptops or netbooks, set-top boxes (STB) such as provided by cable or satellite content providers, or video game system consoles such as the Nintendo® Wii™, the Microsoft® Xbox 360™, or the Sony® PlayStation™ 3, or other video game system consoles. According to some embodiments, processing device 100 may be implemented using any appropriate combination of hardware and/or software configured for, among other things, displaying information to a user, detecting a proximity of an object such as a user, and detecting a face and a gaze of a user. In particular, processing device 100 may include any appropriate combination of hardware and/or software having one or more processors and capable of reading instructions stored on a non-transitory machine-readable medium for execution by the one or more processors for, among other things, displaying information to a user, detecting a proximity of an object such as a user, and detecting a face and a gaze of a user.

Some common forms of machine-readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which one or more processors or computer is adapted to read.

Processing device 100 may include network interface component 102 configured for communication with a network. Consistent with some embodiments, network interface component 102 may be configured to interface with a coaxial cable, a fiber optic cable, a digital subscriber line (DSL) modem, a public switched telephone network (PSTN) modem, an Ethernet device, and/or various other types of wired network communication devices. Network interface component 102 may also include one or more wireless transceivers, wherein each wireless transceiver may include an antenna that is separable or integral and is capable of transmitting and receiving information according to a different wireless networking protocol, such as Wi-Fi™, 3G, 4G, HDSPA, LTE, RF, NFC. Consistent with some embodiments, processing device 100 includes a system bus 104 for interconnecting various components within processing device 100 and communication information between the various components. In some embodiments, the bus 104 is implemented in a System on Chip (SoC) and connects various elements or components on the chip and/or cores of one or more processors. Components may include a processing component 106, which may be one or more processors, central processing units (CPUs), image signal processors (ISPs), micro-controllers, or digital signal processors (DSPs), a system memory component 108, which may correspond to random access memory (RAM), an internal memory component 110, which may correspond to read only memory (ROM), and an external or static memory 112, which may correspond to optical, magnetic, or solid-state memories. Consistent with some embodiments, processing device 100 may also include a display component 114 for displaying information to a user. Display component 114 may be a liquid crystal display (LCD) screen, an organic light emitting diode (OLED) screen (including active matrix AMOLED screens), an LED screen, a plasma display, or a cathode ray tube (CRT) display. Display component 114 may be integrated with processing device 100, or may be separate from processing device 100 and coupled to processing device 100. Display component 114 may have an associated ambient light sensor (not shown) that may be configured to control a brightness of display component 114 based on a detected ambient brightness. Processing device 100 may also include an input and navigation control component 116, allowing for a user to input information and navigate along display component 114. An input and navigation component 116 may include, for example, a keyboard or key pad, whether physical or virtual, a mouse, a trackball, or other such device, or a capacitive sensor-based touch screen. Processing device 100 may include more or less components than shown in FIG. 1 according to some embodiments. For example, processing device 100 may include any one or two of system memory component 108, internal memory component 110, and external memory component 112. Moreover, components shown in FIG. 1 may be directly coupled to one or more other components in FIG. 1, eliminating a need for system bus 104. In general, the components shown in FIG. 1 are shown as examples of components in a processing device 100 capable of performing embodiments disclosed herein. However, a processing device 100 may have more or fewer components and still be capable of performing some embodiments disclosed herein.

Processing device 100 may also include an accelerometer 118 for detecting acceleration of processing device 100. According to some embodiments, acceleration detected by accelerometer 118 may be indicative of movement or motion of processing device 100. For example, a detected acceleration may be indicative of a user 120 picking up or moving processing device 100. According to some embodiments, accelerometer 118 detects an acceleration of device 100 and compares the detected acceleration to a known acceleration that is indicative of motion according to instructions stored in any of memories 108, 110, and 112. In some embodiments, accelerometer 118 may detect an acceleration of device 100 and send information regarding the detected acceleration to processing component 106 for processing the acceleration information according to instructions stored in any of memories 108-112. Based on the provided information, processing component 106 may determine if device is or has been in motion.

Processing device 100 may also include an optical detection sensor module 122. Optical detection sensor module 122 may be any sensor module capable of detecting a face and/or a gaze of a person, such as user 120. Moreover, optical detection sensor module 122 may include one or more processors and at least one memory, the one or more processors being configured to execute instructions stored in the at least one memory to capture optical information and analyze the captured optical information to detect a face and/or gaze of a person such as user 120. In some embodiments, optical detection sensor module 122 captures optical information and sends the information to processing component 106 which may analyze the information to detect a face and/or gaze based on instructions stored in any of optical detection sensor module 122 and memories 108-112.

According to some embodiments, optical detection sensor module 122 may include or be in communication with a camera, such as a built-in front facing camera of processing device 100, or a camera built into a coupled display or a coupled peripheral camera device. The camera may be a visible light camera or a depth-sensing camera, such as the Microsoft® Xbox™ Kinect™ camera. In some embodiments, optical detection sensor module 122 may also include or be in communication with an infrared or other light-based eye tracker that senses light reflected from an eye or particular features within an eye of user 120 to track the eye of user 120. According to some embodiments, optical detection sensor module 122 may be configured to cause a sensor to capture frames of images that are processed within module 122 or, in some embodiments, by processing component 106 for detecting a face in the frames of images and, if a face is detected, detecting a gaze from the face. A face and a gaze may be detected using one or more face and gaze detection algorithms stored in module 122 or any of memories 108, 110, and 112. For example, a gaze may be detected by determining eye direction of a detected face, such as user 120. According to some embodiments, optical detection sensor module 122 may be configured to detect a face and then a gaze of user 120 for use in determining whether to activate or deactivate display component 114, pass a security check of device 100, and/or display an alert or message on display component 114. In some embodiments, optical detection sensor module 122 may be configured to detect a gaze based on user 120 gazing at a predetermined object or area, such as processing device 100 or display component 114. Thus, detecting a gaze as described herein may require user 120 to face processing device 100 or display component 114. In some embodiments, user 120 may only be required to have their eyes looking toward processing device 100 or display component 114 to detect a gaze.

Processing device 100 may also include a proximity sensor 124. Proximity sensor 124 may be configured to detect when an object comes in proximity with device 100. According to some embodiments, the object may be user 120. Moreover, proximity sensor 124 may be configured to detect when an object comes within about 20-50 cm of device 100. Consistent with some embodiments, proximity sensor 124 may be one or more ultrasonic proximity sensors. Proximity sensor 124 may also include one or more heat sensors, such as an infrared heat sensor that detects the heat produced by an object, such as user 120, when the object is in proximity of the device. Proximity sensor 124 may also include one or more electric field proximity sensors that may detect the presence of a conducting or partially conducting object, such as user 120, as the object enters an electric field created by electrodes on or otherwise associated with the sensor. Proximity sensor 124 may also include an ambient light sensor, such as described above with respect to display component 114, that may detect a presence of an object, such as user 120, by the object causing the ambient light to decrease as a result of occlusion of light by the object. According to some embodiments, proximity sensor 124 may be configured to act as a trigger for activating optical detection sensor module 122 and/or a sensor associated with module 122, for example a camera, and initiating face and gaze detection algorithms. By only activating optical detection sensor module 122 and/or its associated sensor and initiating face and gaze detection algorithms when an object, such as user 120, is in proximity of device 100, the device is able to conserve power when a face is not in proximity of device 100.

Although the components of processing device 100 are shown as being integral with processing device 100, the components are not so limited and may be separate from and external to processing device 100, and coupled to processing device 100 and system bus 104 via a wired or wireless coupling.

Consistent with some embodiments, device 100 may use accelerometer 118, optical detection sensor module 122, and proximity sensor 124, individually or in various combinations, to activate display component 114 when user 120 gazes at display component 114 as detected by optical detection sensor module 122, and keep display component 114 activated as long as user 120 is gazing at display component 114. Further to conserve power, device 100 may use accelerometer 118, optical detection sensor module 122, and proximity sensor 124, individually or in various combinations, to deactivate display component 114 when user 120 is not gazing at display component 114, and only activate optical detection sensor module 122 and/or its associated sensor and/or gaze detection in response to a triggering event. Consistent with some embodiments, a triggering event may include at least one of a movement of device 100 detected by accelerometer 118 and a proximity of an object, such as user 120, detected by proximity sensor 124.

Figure 2:
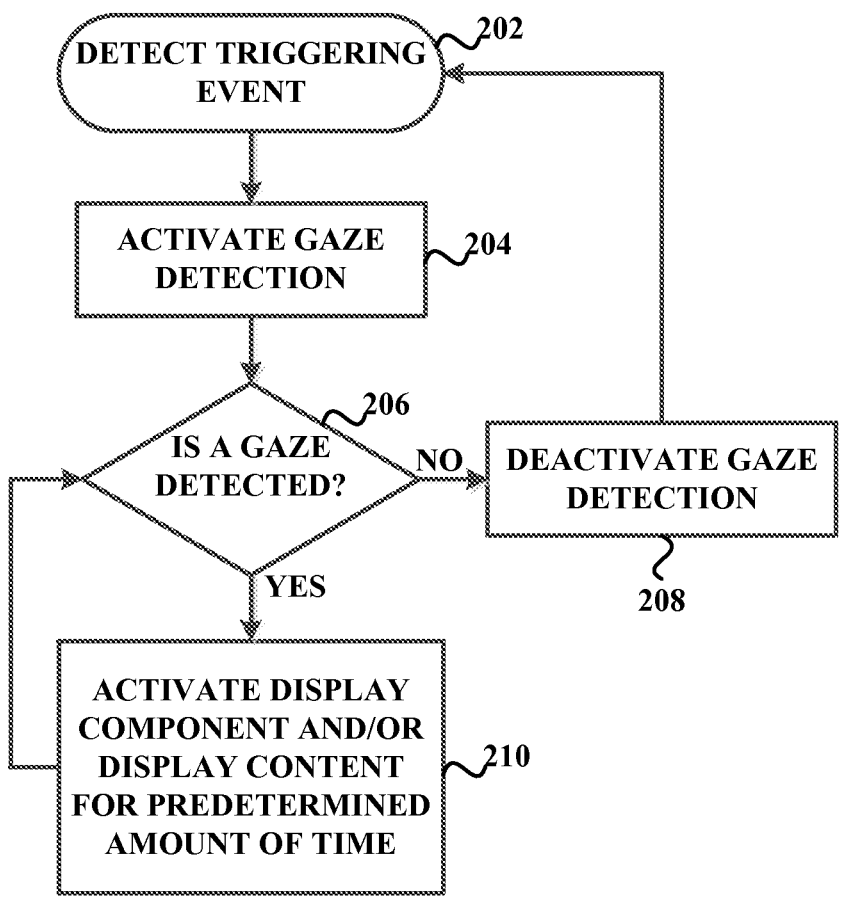
FIG. 2 is a flowchart illustrating a process for device interaction based on detecting a user's gaze, consistent with some embodiments.

FIG. 2 is a flowchart illustrating a process for device interaction based on detecting a user's gaze, consistent with some embodiments. For the purpose of illustration, the process 200 shown in FIG. 2 will be described with reference to FIG. 1. The process shown in FIG. 2 may be embodied in computer-readable instructions for execution by one or more processors in processing component 106 of device 100. In some embodiments, process 200 may be implemented by an operating system of device 100 stored in any of memories 108-112 and executed by processing component 106. In some embodiments, process 200 may be implemented as a background service in the operating system. As shown in FIG. 2, process 200 begins when a triggering event is detected (202), for example by processing component 106. According to some embodiments, a triggering event may be an acceleration detected by accelerometer 118 indicative of a movement of device 100. The detected acceleration may be compared to a known acceleration threshold, by accelerometer 118 or processing component 106, that is indicative of user 120 picking up device 100 to prevent incidental movement of device 100 from being detected as a triggering event. A triggering event may also be a detected proximity of user 120 detected by proximity sensor 124. A detected proximity may also include a detected heat to ensure that a detected proximity is only registered as a triggering event when user 120 is in proximity of proximity detection sensor 124 and device 100. A triggering event may also include an alert generated by a processing component 106. An alert may be a system alert that notifies user 120 of a received e-mail, telephone call, or other message, or an alert notifying user 120 of an upcoming calendar appointment, and the like. In some embodiments, a triggering event comprises a user touching the device, for example as may be detected with a touchscreen and/or with one or more capacitive touch sensors disposed on an edge of the device and/or with an electric field sensor.

In some embodiments, a triggering event may be a combination of any of an acceleration detected by acceleration sensor 118, a proximity of user 120 by proximity sensor 124, or an alert generated by processing component 106. For example, processing component 106 may generate an alert causing processing device 100 to vibrate, generate an audible sound, or generate a flashing light, or other indicator that may capture the attention of user 120 to let user 120 know about the alert. User 120 may then pick up device 100 and bring device 100 in close proximity to view the alert. Accelerometer 118 may detect the motion of picking up the device 100, and proximity sensor 124 may detect the proximity of user 120. In some embodiments, the triggering event comprises an alert generated by processing component 106 and a user being within a threshold proximity of the device. The combination of any or all of these actions may be a triggering event that causes processing component 106 to perform a subsequent action.

After a triggering event has been detected, gaze detection is activated (204). In some embodiments, activating gaze detection comprises activating or initiating a gaze detection module, function, and/or process, for example as executed by optical detection sensor module 122 and/or processing component 106, or a combination thereof. According to some embodiments, activating gaze detection includes activating optical detection sensor module 122 to capture and process, within the module 122 and/or by processing component 106, optical images for detecting a gaze. Moreover, activating gaze detection may include activating face detection and then, if a face is detected, activating gaze detection. In some embodiments, activating gaze detection may include increasing a duty cycle or frame rate of an optical detection sensor associated with module 122 such that optical detection sensor captures more images than before gaze detection was activated. Optical detection sensor module 122, using functionality included within module 122 and/or in combination with processing component 106 and instructions stored in any of memories 108, 110, and 112, may determine if a gaze is detected (206). A gaze may be detected using any of a number of gaze detection algorithms, and may include facial detection performed according to known facial detection algorithms. For example, if a face is detected, optical detection sensor module 122 may determine if the face is gazing in the direction of display component 114 by analyzing information captured by an optical detection sensor to determine a direction of the eyes on the detected face. Optical detection sensor module 122 may also determine if the face is gazing in the direction of display component 114 by analyzing other features of the detected face, such as corners of the eyes or mouth, eyebrows on the detected face, ears on the detected face, or other facial features that may be used to determine a direction of a gaze.

If a gaze is not detected, gaze detection may be deactivated (208) until another triggering event is detected (202). In some embodiments, deactivating gaze detection may include powering down optical detection sensor module 122 and/or an associated sensor to conserve power. In some embodiments, deactivating gaze detection may include lowering a duty cycle or frame rate of the optical detection sensor so that fewer images are captured than when gaze detection is activated. In some embodiments, deactivating gaze detection may include the optical detection sensor continuing to capture images without optical detection sensor module 122 processing the captured images. In such embodiments, the captured images may be stored in a buffer, a memory internal to optical detection sensor module 122, or any of memories 108-112.

If a gaze is detected, display component 114 may be activated and/or content may be displayed on display component 114 for a predetermined amount of time (210) allowing user to view information on display component 114. Activating display component 114 and displaying content may include passing a keylock or security challenge. In some embodiments, activating display component 114 may cause processing component 106 to generate a keylock or security challenge that may be displayed by display component 114. A keylock may be a slider or other motion challenge that requires users to take an action to remove the keylock, such as sliding the slider in an indicated direction. A security challenge may be a required password, personal identification number (PIN), pattern challenge, or biometric challenge presented to a user for security purposes. In some embodiments, at least one of a keylock and a security challenge may be required by an operating system of device 100 after a predetermined time of inactivity or after user 120 manually locks device 100 via a lock switch or command to secure device 100. Activating display component 114 via a detected gaze may bypass the keylock or security challenge. For example, if gaze detection detects a gaze, the detection of the gaze may be sufficient to activate display component 114 and bypass a keylock, but not sufficient to bypass a security challenge. However, in some embodiments, if gaze detection includes facial detection, optical detection sensor module 122 alone, or in combination with processing component, may be configured to detect a face and determine if the detected face matches a known face, such as a face of user 120 or other authorized user, that may be stored in an internal memory of optical detection sensor module 122 or any of memories 108-112. If a detected face matches a face of user 120, a security challenge may be bypassed when display component 114 is activated.

After the predetermined amount of time has passed, optical detection sensor module 122 may again determine if a gaze is detected (206), and display component 114 may remain active and/or display content if a gaze is still detected (210). If a gaze is no longer detected after the predetermined amount of time, the display may deactivate and/or the content may no longer be displayed, and gaze detection by optical detection sensor module 122 may be deactivated (208) until another triggering event is detected (202). In some embodiments, user 120 may be able to deactivate display component 114 and deactivate gaze detection prior to or instead of the amount of time passing. For example, user may manually turn off display component 114 and/or gaze detection by pressing a button, whether physical or virtual and displayed on display component 114, or changing a setting of device 100. In some embodiments, optical detection sensor module 122 may be further configured to detect a gesture, wherein a detected gesture may instruct display component 114 and/or gaze detection to be deactivated. For example, a swipe over the display component 114 or occluding an optical sensor of the device 100 may be used in some embodiments to dismiss an alert and/or prevent display component 114 from activating. In some embodiments, an ambient light sensor, such as described previously, may be used to deactivate display component 114 and/or gaze detection. For example, an ambient light sensor may detect that there is no, or a very small amount, of ambient light, which may be indicative of device being placed in a drawer, a bag, or a pocket. The ambient light sensor may send this information to processing component 106 which may make a determination to deactivate display component 114 and/or gaze detection to conserve power.

In some embodiments, a user 120 may be able to further interact with the content displayed on the activated display component 114 through gaze detection and/or eye tracking implemented by optical detection sensor module 122 alone or in combination with processing component 106. For example, user 120 may be able to move his/her eyes from one side to the other in a "swipe" motion which, when detected by optical detection sensor module 122, may be interpreted as a swipe to content displayed on display component 114, dismissing a displayed alert, moving to a next message, etc. Detecting that user 120 is gazing at displayed content for a predetermined period of time may be interpreted as selecting the content. Detecting that user 120 is blinking may be interpreted that user 120 is closing the displayed content. Detecting that user 120 is looking at the content for a predetermined period of time in combination with a detected head nod may be interpreted as a selection of the displayed content such that user 120 is capable of moving the displayed content on a screen of display component 114, such as to move the content into a file folder, delete the content, etc. In some embodiments, detecting a gaze to activate display component 114 and display content on display component 114 may be combined with known gaze and head or facial gesture detection algorithms to translate gestures made by a head or face of user 120 to interact with the displayed content in additional ways, for example after the display component 114 has been activated and content is being displayed.

Consistent with some embodiments, process 200 illustrated in FIG. 2 may provide power savings by only activating gaze detection in response to a triggering event, and keeping the display component active and the content displayed as user 120 is gazing at optical detection sensor module 122. Moreover, process 200 illustrated in FIG. 2 may also provide for enhanced interaction with device 100 by user 120, allowing user 120 to interact with device 100 to view content displayed on display component 114 by gazing at optical detection sensor module 122 of device 100.

Figure 3:
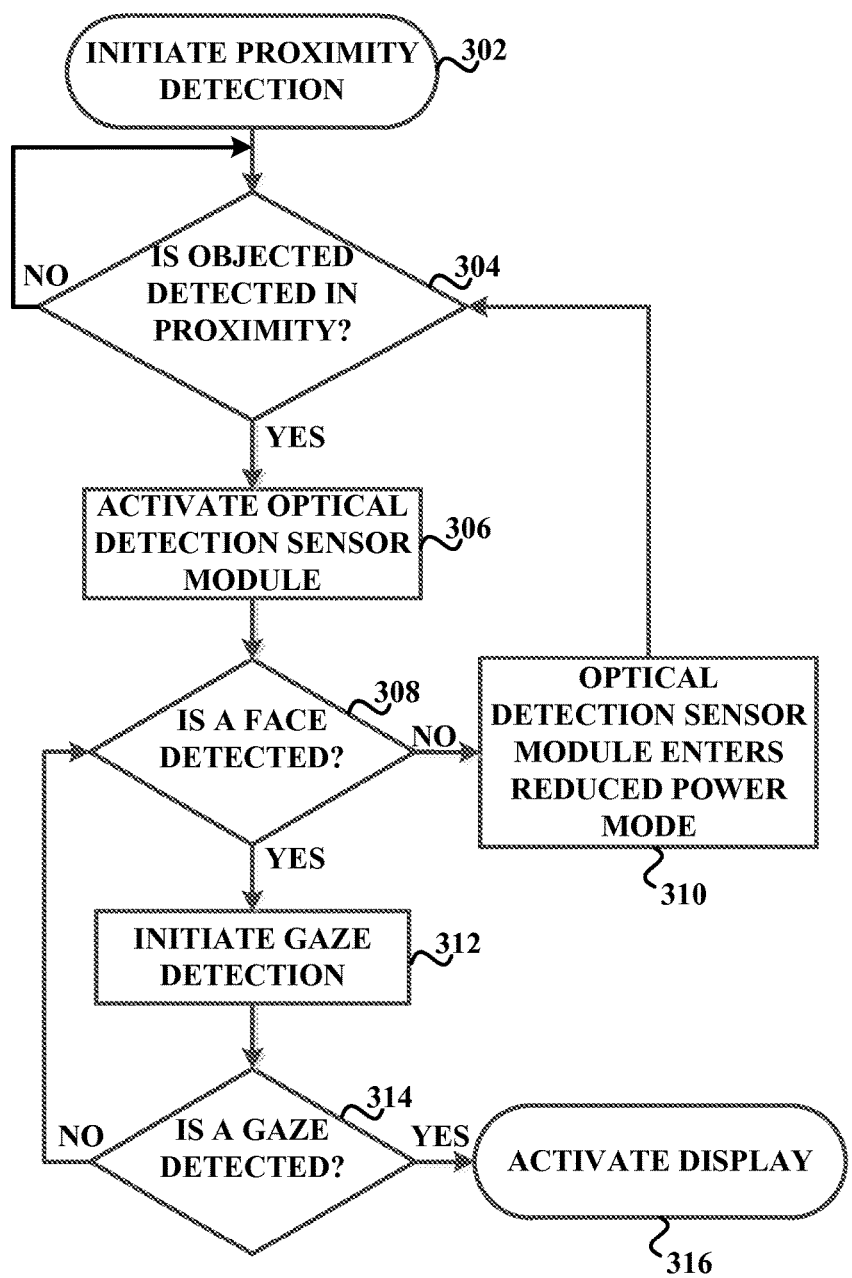
FIG. 3 is a flowchart illustrating a process for activating a display component of a device using gaze detection, consistent with some embodiments

FIG. 3 is a flowchart illustrating a process for activating display component 114 of device 100 using gaze detection, consistent with some embodiments. For the purpose of illustration, FIG. 3 will be described with reference to FIG. 1. The process 300 shown in FIG. 3 may be embodied in computer-readable instructions for execution by one or more processors in processing component 106 of device 100. In some embodiments, process 300 may be implemented by an operating system of device 100 stored in any of memories 108-112 and executed by processing component 106. In some embodiments, process 200 may be implemented as a background service in the operating system. As shown in FIG. 3, process 300 begins by initiating proximity detection using proximity detection sensor 124 (302). In some embodiments, proximity detection may be initiated by user 120. In some embodiments, proximity detection may be initiated automatically by the operating system of device 100. The initiation of proximity detection may be in response to a triggering event, such as described above with respect to FIG. 2. Proximity detection may also be initiated when device 100 is powered on, and may remain on for the duration that device 100 is powered on. Proximity detection sensor 124, in combination with processing component 106 and instructions stored in any of memories 108, 110, and 112, may determine if an object is detected in proximity of proximity detection sensor (304). According to some embodiments, determining if an object is in proximity may include detecting proximity using ultrasonic and/or infrared sensors. Moreover, determining if an object is in proximity may also include detecting a heat of an object so that non-user objects are not detected. Proximity detection may also include detecting a decrease in ambient light using an ambient light sensor caused by an object, such as user 120, occluding background light as user 120 comes into proximity of device 100.

After proximity detection is initiated, proximity detection sensor 124 may continue to monitor for objects in the proximity of proximity detection sensor 124. When proximity detection sensor 124 detects an object in proximity, optical detection sensor module 122 may be activated (306). In some embodiments, proximity detection sensor 124 may consume less power than the optical detection sensor module 122 and/or an optical sensor associate therewith. Thus, in some embodiments, monitoring for nearby objects using the proximity detection sensor 124 may save power compared to monitoring for nearby objects using the optical detection sensor module 122. Information captured by optical detection sensor module 122 may be analyzed to determine if a face is detected (308). In some embodiments, the information captured by optical detection sensor module 122 may be analyzed by executing a process or function, such as a facial detection algorithm, within optical detection sensor module 122. The information captured by optical detection sensor module 122 may also be sent to processing component 106 for analysis according to a facial detection algorithm stored in any of memories 108-112. Moreover, information captured by optical detection sensor module may be analyzed by a combination of processing component 106 and optical detection sensor module 122 according to a facial detection algorithm. In some embodiments, the facial detection algorithm may be any known facial detection algorithm. If a face is not detected, optical detection sensor module 122 and/or an associated sensor may enter a reduced power mode (310) until another object is detected in proximity of proximity detection sensor 124 (304). In some embodiments, a reduced power mode for optical detection sensor module 122 may include powering down an associated sensor to conserve power. In some embodiments, a reduced power mode may include lowering a duty cycle or frame rate of the associated sensor so that fewer images are captured than when optical detection sensor module 122 is activated. In some embodiments, a reduced power mode may include an optical sensor continuing to capture images without optical detection sensor module 122 processing the captured images. In such embodiments, the captured images may be stored in a buffer, a memory internal to optical detection sensor module 122, or any of memories 108-112.

If a face is detected at 308, gaze detection may be initiated (312). In some embodiments, initiating gaze detection comprises activating or initiating a gaze detection module, function, and/or process, for example as executed by optical detection sensor module 122 and/or processing component 106, or a combination thereof. According to some embodiments, initiating gaze detection includes initiating optical detection sensor module 122 to capture and process, within module and/or by processing component 106, optical images for detecting a gaze. In some embodiments, initiating gaze detection may include increasing a duty cycle or frame rate of an optical sensor associated with optical detection sensor module 122 such that optical detection sensor module 122 captures more images than before gaze detection was activated. Optical detection sensor module 122, using functionality included within module 122 and/or in combination with processing component 106 and instructions stored in any of memories 108, 110, and 112, may determine if a gaze is detected (314). A gaze may be detected using any number of gaze detection algorithms, for example as described above, which may include analyzing information captured by optical detection sensor module 122 to determine a direction of the eyes on the detected face. A gaze may also be detected by analyzing other features of a detected face, such as corners of the eyes or mouth, eyebrows on the detected face, ears on the detected face, or other facial features that may be used to determine a direction of a gaze and to determine if a detected face is gazing in a direction of display component 114. If a gaze is not detected, optical detection sensor module 122 continues to look for a gaze (308, 312, 314) as long as a face is still in the field of view of optical detection sensor module 122. In some embodiments, however, if a gaze is not detected after a predetermined period of time, optical detection sensor module 122 may enter a reduced power mode (310) and gaze detection may be deactivated. However, if a gaze is detected, display component 114 may be activated (316) allowing user to view content displayed on display component. Activating display component 114 and displaying content may include passing a keylock or security challenge, such as described above with respect to process 200 illustrated in FIG. 2. Moreover, a user 120 may be able to further interact with the content displayed on the activated display component 114 through gaze detection and/or eye tracking implemented by optical detection sensor module 122 alone or in combination with processing component 106, such as described above with respect to process 200 in FIG. 2.

Consistent with some embodiments, process 300 illustrated in FIG. 3 may provide power savings by activating display component 114 when user 120 is determined to be within a predetermined proximity of device 100 and actively gazing at device 100. Moreover, process 300 provides further power savings by activating gaze detection if a face is detected that is within a predetermined proximity of device 100. Furthermore, process 300 may also provide for enhanced interaction with device 100 by user 120, allowing user 120 to interact with device 100 to view content displayed on display component 114 by gazing at optical detection sensor module 122 of device 100.

Figure 4:
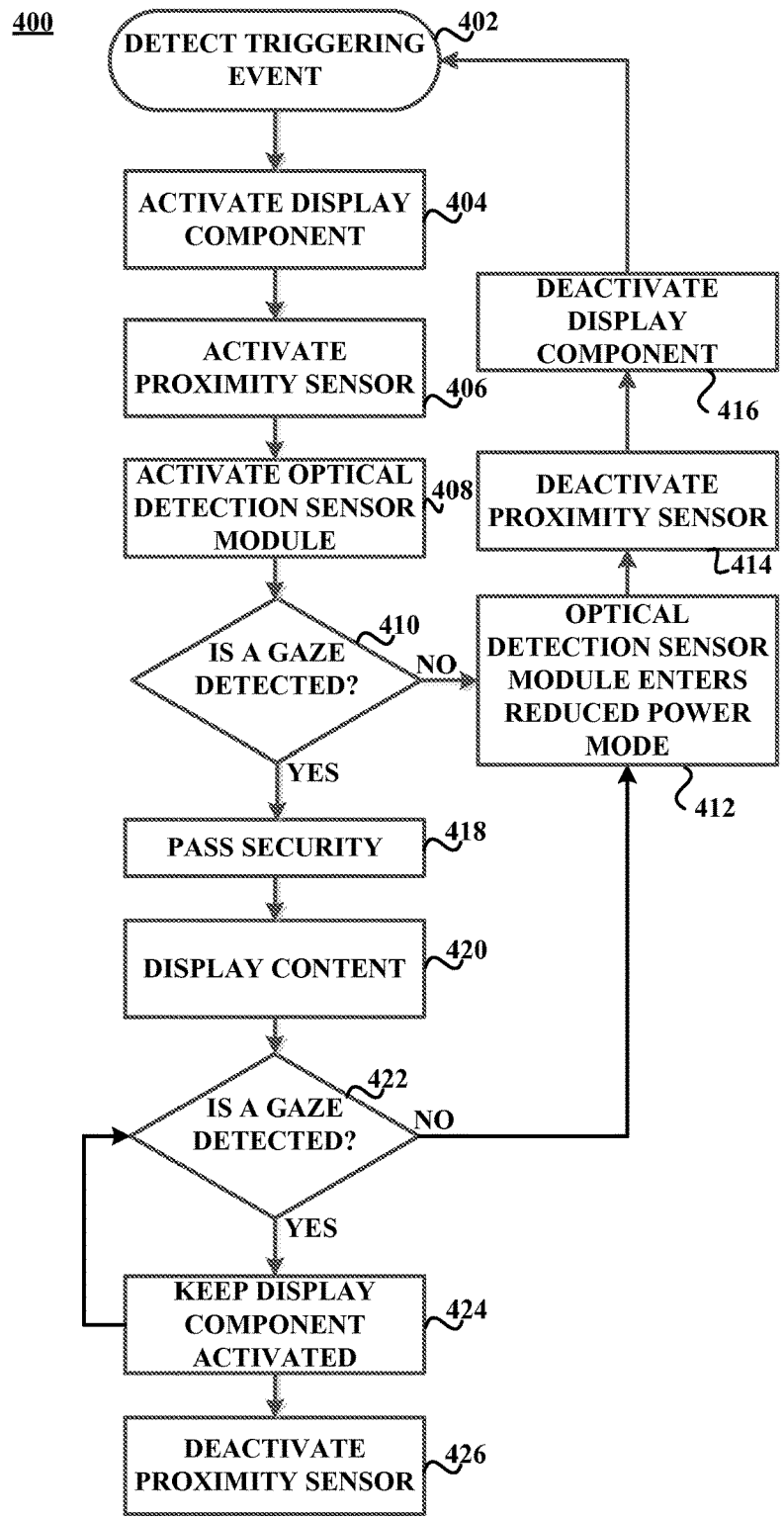
FIG. 4 is a flowchart illustrating a process for displaying content on a display component using gaze detection, consistent with some embodiments.

FIG. 4 is a flowchart illustrating a process for displaying content on display component 114 using gaze detection, consistent with some embodiments. For the purpose of illustration, FIG. 4 will be described with reference to FIG. 1. The process 400 shown in FIG. 4 may be embodied in computer-readable instructions for execution by one or more processors in processing component 106 of device 100. In some embodiments, process 400 may be implemented by an operating system of device 100 stored in any of memories 108-112 and executed by processing component 106. In some embodiments, process 400 may be implemented as a background service in the operating system. As shown in FIG. 4, process 400 begins when a triggering event is detected (402). According to some embodiments, a triggering event may be an acceleration detected by accelerometer 118 indicative of a movement of device 100. The detected acceleration may be compared to a known acceleration threshold, by accelerometer 118 or processing component 106, that is indicative of user 120 picking up device 100 to prevent incidental movement of device 100 from being detected as a triggering event. A triggering event may also be a detected proximity of user 120 detected by proximity sensor 124. A detected proximity may also include a detected heat to ensure that a detected proximity is only registered as a triggering event when user 120 is in proximity of proximity detection sensor 124 and device 100. A triggering event may also include an alert generated by a processing component 106. An alert may be a system alert that notifies user 120 of a received e-mail, telephone call, or other message, or an alert notifying user 120 of an upcoming calendar appointment, and the like.

In some embodiments, a triggering event may comprise a combination of any of an acceleration detected by acceleration sensor 118, a proximity of user 120 by proximity sensor 124, a touch, or an alert generated by processing component 106. For example, processing component 106 may generate an alert causing processing device 100 to vibrate, generate an audible sound, or generate a flashing light, or other indicator that may capture the attention of user 120 to let user 120 know about the alert. User 120 may then pick up device 100 and bring device 100 in close proximity to view the alert. Accelerometer 118 may detect the motion of picking up the device 100, and proximity sensor 124 may detect the proximity of user 120. The combination of any or all of these actions may be a triggering event that causes processing component 106 to perform a subsequent action.

In response to detecting a triggering event, display component 114 may be activated (404). In some embodiments, operating system running on device 100 may automatically activate display component 114 when a triggering event is detected, for example, to provide an indication of the triggering event and/or provide user 120 with a preview of the triggering event, such as an alert. If no action is taken after a predetermined time, the operating system may deactivate display component 114 to conserve power. Proximity sensor 124 may also be activated in response to detecting a triggering event (406). In some embodiments, proximity sensor 124 may be configured to be active when display component 114 is active and inactive, or in a reduced power mode, when display component is not active. The configuration of proximity sensor 124 may be an operating system configuration.

In response to detecting a triggering event, optical detection sensor module 122 may also be activated (408). Optical detection sensor module 122, using functionality within module 122 and/or in combination with processing component 106 and instructions stored in any of memories 108, 110, and 112, may determine if a gaze is detected (410). A gaze may be detected using any of a number of gaze detection algorithms, and may include facial detection performed according to known facial detection algorithms. For example, if a face is detected, optical detection sensor module 122 may determine if the face is gazing in the direction of display component 114 by analyzing information captured by optical detection sensor module 122 to determine a direction of the eyes on the detected face. Optical detection sensor module 122 may also determine if the face is gazing in the direction of display component 114 by analyzing other features of the detected face, such as corners of the eyes or mouth, eyebrows on the detected face, ears on the detected face, or other facial feature that may be used to determine a direction of a gaze.

If a gaze is not detected, optical detection sensor module 122 may enter a reduced power mode (412). In some embodiments, a reduced power mode for optical detection sensor module 122 may include powering down an optical sensor to conserve power. In some embodiments, a reduced power mode may include lowering a duty cycle or frame rate of an optical detection sensor so that fewer images are captured than when optical detection sensor module is activated. In some embodiments, a reduced power mode may include an optical sensor continuing to capture images without optical detection sensor module 122 processing the captured images. In such embodiments, the captured images may be stored in a buffer, a memory internal to optical detection sensor module 122, or any of memories 108-112.

If a gaze is not detected, proximity sensor 124 may also be deactivated (414). Deactivation of proximity sensor 124 may include entering a low power mode that may be similar to a low power mode of optical detection sensor module 122. In some embodiments, deactivation of proximity sensor may include deactivating proximity sensor 124 so that it is not consuming power. If a gaze is not detected, display component 114 may also be deactivated (416) until another triggering event is detected (402). Deactivating display component 114 may include deactivating a backlight of display component 114 so that content rendered for display by display component is not visible to user 120. Deactivating display component 114 may also include deactivating rendering and processing capabilities associated with display component 114 such that content is not rendered for display by display component 114 while deactivated. Although display component 114 may be automatically deactivated in 416, in some embodiments, user 120 may be able to deactivate display component 114 by, for example, pressing a button, whether physical or virtual and displayed on display component 114, or changing a setting of device 100. In some embodiments, optical detection sensor module 122 may be further configured to detect a gesture, wherein a detected gesture may deactivate display component 114. Moreover, display component 114 may be deactivated in response to a detection of no or a very small amount of ambient light by an ambient light sensor, such as described above.

If a gaze is detected by optical detection sensor module 122, a keylock or security challenge may be passed (418). In some embodiments, a detected gaze may be sufficient to bypass a keylock, but not sufficient to bypass a security challenge such as a password or PIN. According to some embodiments, optical detection sensor module 122 alone, or in combination with processing component 106, may be configured to detect a face and determine if the detected face matches a known face, such as a face of user 120, that may be stored in an internal memory of optical detection sensor module 122 or any of memories 108-112. If a detected face matches a face of user 120, a security challenge may be bypassed when display component 114 is activated. In some embodiments, a type of trigger may determine whether the security challenge is bypassed. For example, an alert of a newsfeed being updated may cause the security challenge to be bypassed, but reception of a personal email may still cause a security challenge to be presented. In some embodiments, authorized users are authorized for all content on the device. In other embodiments, each authorized user may have a set of permissions that determine if a security challenge will be presented upon recognition of the authorized user and/or if the user will be permitted access when a given type of triggering event occurs. In some embodiments, authenticating a user may comprise matching a color of the user's eyes to known eye colors and/or validating biometric data of the user, for example a shake of the user's eyes. Display component 114 may display content (420) after a user has passed security. The displayed content may be the triggering alert described above, such as a received e-mail, calendar alert, message and the like. The content may be displayed on display component for a predetermined time, after which optical detection sensor may determine if user 120 is still gazing at optical detection sensor module 122 (422). If a gaze is not detected, optical detection sensor module 122 may enter a reduced power mode (412), proximity sensor 124 may be deactivated (414), and display component 114 may be deactivated (416), such as described above, until another triggering event is detected (402) or user 120 manually activates any of these components. If a gaze is detected, display component 114 may remain activated (424) as long as a gaze is detected or until user manually deactivates display component 114, and proximity sensor 124 may be deactivated to save power (426). Moreover, a user 120 may be able to further interact with the content displayed on the activated display component 114 through gaze detection and/or eye tracking implemented by optical detection sensor module 122 alone or in combination with processing component 106, such as described above with respect to process 200 in FIG. 2.

Consistent with some embodiments, process 400 may provide power savings by activating display component 114 for displaying content when user 120 is determined to be actively gazing at device 100. Moreover, process 400 may provide further power savings by activating proximity sensor 124 and optical detection sensor module 122 in response to a triggering event. Furthermore, process 400 may also provide for enhanced interaction with device 100 by user 120, allowing user 120 to interact with device 100 to pass a keylock or security challenge and view content displayed on display component 114 by gazing at optical detection sensor module 122 of device 100.

Software, in accordance with the present disclosure, such as program code and/or data, may be stored on one or more machine readable mediums, including non-transitory machine readable medium. such as any of memories 108, 110, and 112 in device 100. It is also contemplated that software identified herein may be implemented using one or more general purpose or specific purpose computers or application specific integrated circuits (ASICs) and/or computer systems, networked and/or otherwise. Where applicable, the ordering of various steps described herein may be changed, combined into composite steps, and/or separated into sub-steps to provide features described herein.

Consequently, embodiments as described herein may provide user convenience, by allowing a user to activate and unlock a device by looking at an optical detection sensor integrated into or coupled to the device. Moreover, embodiments as described herein may also provide power savings, by activating gaze detection only in response to one or more triggering events and then only activating the display of the device when a gaze is detected. The examples provided above are exemplary only and are not intended to be limiting. One skilled in the art may readily devise other systems consistent with the disclosed embodiments which are intended to be within the scope of this disclosure. As such, the application is limited only by the following claims.

What is claimed is:

1. A system for interacting with a device based on a detected gaze, comprising:
   one or more sensors configured to detect a triggering event when operating at a high power state, wherein the one or more sensors are also configured to operate in a low power state;
   a display component;
   an optical detection sensor module configured to capture one or more images at a first image capture rate and to capture one or more images at a second image capture rate, the optical detection sensor module being configured to capture at least one image when operating at the first image capture rate and at least one image when operating at the second image capture rate; and
   one or more processors coupled to the one or more sensors, the display component, and the optical detection sensor module, the one or more processors configured to:
   activate gaze detection upon detection of the triggering event;
   upon detection of the triggering event by the one or more sensors and activation of the gaze detection, cause at least one of the one or more sensors to enter the low power state, wherein the one or more sensors consume less power in the low power state than in the high power state;
   upon detection of the same triggering event by the one or more sensors and activation of the gaze detection, command the optical detection sensor module to increase from the first image capture rate for capturing at least one image to the second image capture rate for capturing at least one image and to perform the gaze detection, wherein the one or more sensors operate in the low power state and the optical detection sensor module uses the second image capture rate when the gaze detection is activated;
   perform the gaze detection by detecting detect a gaze of a user based on the one or more images captured at the second image capture rate;
   upon detection of the gaze of the user, cause the display component to enter an activated state from a deactivated state; and
   after a predetermined amount of time when the gaze is no longer detected, cause the display component to enter the deactivated state.

2. The system of claim 1, wherein the one or more sensors configured to detect a triggering event comprise an accelerometer configured to detect motion of the device.

3. The system of claim 1, wherein the one or more sensors configured to detect a triggering event comprise a proximity sensor coupled to the display component, the proximity sensor configured to detect when the user is within a predetermined proximity of the display component.

4. The system of claim 3, wherein the proximity sensor comprises one or more ultrasonic proximity sensors or an electric field sensor.

5. The system of claim 1, wherein the optical detection sensor module comprises a camera coupled to the display component.

6. The system of claim 1, further comprising:
a network interface component configured to receive information from a network; and
wherein the one or more processors are configured to generate a device alert in response to the received information, wherein the triggering event comprises the device alert.

7. A method for device interaction, comprising:
detecting, at one or more sensors operating at a high power state, a triggering event;
activating gaze detection upon detection of the triggering event;
upon detection of the triggering event by the one or more sensors and activation of the gaze detection, causing at least one of the one or more sensors to enter a low power state, wherein the one or more sensors consume less power in the low power state than when in the high power state;
upon detection of the same triggering event by the one or more sensors and activation of the gaze detection, causing an optical detection sensor to increase from a first image capture rate for capturing at least one image to a second image capture rate for capturing at least one image and to perform the gaze detection, the optical detection sensor module being configured to capture at least one image when operating at the first image capture rate and at least one image when operating at the second image capture rate; activating gaze detection based on the detected triggering event, wherein the one or more sensors operate in the low power state and the optical detection sensor uses the second image capture rate when gaze detection is activated;
determining, based on information from the optical detection sensor, whether a gaze is detected using the activated gaze detection;
activating, from a deactivated state, a display of the device when a gaze is detected; and deactivating the gaze detection after a predetermined amount of time when a gaze is not detected.

8. The method of claim 7, wherein detecting a triggering event comprises detecting at least one of a device alert, a proximity of a user, and a motion of the device.

9. The method of claim 8, wherein the detecting a device alert comprises detecting at least one of a received message and a calendar alert.

10. The method of claim 8, wherein the one or more sensors include at least one of an ultrasonic sensor, an electric field sensor, an ambient light sensor, and an infrared sensor, and wherein detecting a proximity of a user comprises detecting a proximity of the user using at least one of the ultrasonic sensor, the electric field sensor, the ambient light sensor, and the infrared sensor.

11. The method of claim 8, wherein detecting a motion of the device comprises detecting an acceleration of the device.

12. The method of claim 7, wherein activating a display of the device comprises activating the display of the device and bypassing at least one of a keylock and a security challenge.

13. The method of claim 7, wherein determining whether a gaze is detected comprises detecting a face of a user and at least one of an eye direction of the detected face, one or more corners of eyes and a mouth of the detected face, and ears on the detected face.

14. The method of claim 13, wherein determining whether a gaze is detected further comprises performing facial recognition on the detected face, wherein the display is activated when the detected face is recognized as an authorized user of the device.

15. The method of claim 7, wherein the gaze is detected and the display is activated, and wherein the method further comprises maintaining the display in an active state until the gaze is no longer detected.

16. The method of claim 7, wherein determining whether a gaze is detected further comprises performing facial recognition on a detected face, wherein a security challenge is bypassed when the detected face is recognized as an authorized user of the device.

17. A system for device interaction, comprising:
means for detecting a triggering event when the means for detecting the triggering event is operating at a high power state, wherein the means for detecting the triggering event is also configured to operate in a low power state;
means for detecting a gaze, the means for detecting the gaze being activated to perform gaze detection when the triggering event is detected by the means for detecting the triggering event, wherein activating the means for detecting the gaze comprises increasing a duty cycle of the means for detecting the gaze, wherein increasing the duty cycle includes increasing from a first image capture rate for capturing at least one image to a second image capture rate for capturing at least one image, the means for detecting the gaze being configured to capture at least one image when operating at the first image capture rate and at least one image when operating at the second image capture rate;
means for, upon detection of the same triggering event by the means for detecting the triggering event, causing the means for detecting the triggering event to enter the low power state, wherein the means for detecting the triggering even consumes less power while operating in the lower power state than when in the high power state, wherein the means for detecting the triggering event operates in the low power state and the means for detecting a gaze uses the increased duty cycle when gaze detection is activated;
means for determining whether a gaze is detected based on the triggering event being detected;
means for activating, from a deactivated state, a display of the device when the gaze is detected; and
means for deactivating the means for detecting the gaze after a predetermined amount of time if the gaze is not detected.

18. The system of claim 17, wherein the means for detecting a triggering event comprises means for detecting at least one of a device alert, a proximity of a user, and a motion of the device.

19. The system of claim 18, wherein the device alert comprises at least one of a received message and a calendar alert.

20. The system of claim 18, wherein the means for detecting a triggering event comprises a means for detecting a proximity of a user.

21. The system of claim 20, wherein the means for detecting a proximity of a user comprises at least one of an ultrasonic sensor, an electric field sensor, an ambient light sensor, and an infrared sensor.

22. The system of claim 18, wherein the means for detecting a triggering event comprises an accelerometer configured to detect an acceleration of the device.

23. The system of claim 17, wherein the means for activating a display of the device comprises means for bypassing at least one of a keylock and a security challenge.

24. The system of claim 17, wherein the means for determining whether a gaze is detected comprises means for detecting a face of a user and at least one of an eye direction of the detected face, one or more corners of eyes and a mouth of the detected face, and ears on the detected face.

25. The system of claim 24, wherein the means for detecting a face of the user is configured to perform facial recognition on the detected face, the means for activating the display activating the display when the detected face is recognized as an authorized user of the device.

26. The system of claim 17, wherein the means for determining whether a gaze is detected comprises means for performing facial recognition on a detected face and bypassing a security challenge when the detected face is recognized as an authorized user of the device.

27. A non-transitory computer-readable medium including instructions that when executed by one or more processors of a device cause the one or more processors to:

detect, via one or more sensors operating at a high power state, a triggering event, wherein the one or more sensors are also configured to operate in a low power state;

activate gaze detection upon detection of the triggering event;

increase, from a decreased state for capturing at least one image, an image capture rate of images captured for gaze detection when upon detection of the triggering event by the one or more sensors and activation of the gaze detection is detected, wherein at least one image is captured at the decreased state and at least one image is captured at the increased image capture rate;

cause the one or more sensors to enter the low power state when upon detection of the same triggering event by the one or more sensors and activation of the gaze detection is detected, wherein the one or more sensors operate in the low power state and the increased image capture rate is used when the gaze detection is performed;

determine whether a gaze is detected using the activated gaze detection;

activate, from a deactivated state, a display of the device when the gaze is detected;

deactivate the gaze detection after a predetermined amount of time when the gaze is not detected; and cause the one or more sensors to enter a high power state after the gaze is no longer detected, wherein the one or more sensors consume more power in the high power state than in the low power state.

28. The system of claim 1, wherein the one or more processors are configured to, after the gaze is no longer detected, cause the one or more sensors to enter the high power state.

29. The system of claim 1, wherein the one or more sensors include a first sensor and a second sensor, wherein causing at least one of the one or more sensors to enter the low power state includes causing the first sensor to enter the lower power state, and wherein the second sensor remains in the high power state upon detection of the triggering event.

30. The system of claim 29, wherein the first sensor includes an accelerometer and the second sensor includes a proximity sensor.

31. The system of claim 30, wherein the triggering event is detected in response to the accelerometer detecting motion of the device and the proximity sensor detecting when the user is within a predetermined proximity of the display component.

\* \* \* \* \*